(12) United States Patent
Pei

(10) Patent No.: US 8,459,808 B2
(45) Date of Patent: Jun. 11, 2013

(54) LIGHT BLOCKING PLATE AND LENS MODULE HAVING SAME

(75) Inventor: Shao-Kai Pei, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 319 days.

(21) Appl. No.: 12/859,264

(22) Filed: Aug. 19, 2010

(65) Prior Publication Data

US 2011/0267684 A1 Nov. 3, 2011

(30) Foreign Application Priority Data

Apr. 28, 2010 (TW) .................. 99113389 A

(51) Int. Cl.
*G02B 27/00* (2006.01)

(52) U.S. Cl.
CPC .................. *G02B 27/0018* (2013.01)
USPC .......................... 359/614; 359/601

(58) Field of Classification Search
USPC .................. 359/350–361, 601–614
See application file for complete search history.

(56) References Cited

U.S. PATENT DOCUMENTS

| | | | |
|---|---|---|---|
| 6,982,181 B2 * | 1/2006 | Hideo | 438/30 |
| 8,009,980 B2 * | 8/2011 | Pei et al. | 396/544 |
| 8,035,039 B2 * | 10/2011 | Cha et al. | 174/389 |
| 8,246,795 B2 * | 8/2012 | Pei | 204/192.26 |

* cited by examiner

*Primary Examiner* — Thong Nguyen
(74) *Attorney, Agent, or Firm* — Altis Law Group, Inc.

(57) ABSTRACT

An exemplary light blocking plate includes a flat plate-like light pervious member, and a blocking and shielding layer formed on the light pervious member. The blocking and shielding layer includes a top surface facing away from the light pervious member, a bottom surface facing the light pervious member, and a through hole extending from the top surface to the bottom surface. The blocking and shielding layer includes an electromagnetic shielding layer having a first part of the top surface, and a light blocking layer. The light blocking layer includes a first portion having the bottom surface, and a second portion having a second part of the top surface, and extending from the first portion to the second part of the top surface. The electromagnetic shielding layer surrounds the second portion of the light blocking layer. The second portion of the light blocking layer surrounds the through hole.

10 Claims, 12 Drawing Sheets

LIGHT BLOCKING PLATE AND LENS MODULE HAVING SAME

BACKGROUND

1. Technical Field

The present disclosure relates to optical imaging and particularly to, a light blocking plate, a lens module with the light blocking plate, and a method for making the light blocking plate.

2. Description of Related Art

Nowadays, lens modules have been widely used in various portable electronic devices, such as mobile phones, personal digital assistants (PDAs), etc. The lens modules of the portable electronic devices have undergone various stages of miniaturization. It is required that optical elements (e.g., a light blocking plate) used in the lens module be accordingly miniaturized.

A typical light blocking plate is made by processing a plastic/metal tape under exposure, developing, etc. The equipment used in the processing is very expensive, and the process is harmful to the environment. In addition, the thickness of the light blocking plate is generally larger than 30 μm. Such a light blocking plate may not meet the demand for the miniaturization of the lens module.

Therefore, what is needed is a new light blocking plate, which can overcome the above-mentioned problems.

SUMMARY

One embodiment provides a light blocking plate. The light blocking plate includes a flat plate-like light pervious member and a blocking and shielding layer formed on the light pervious member. The blocking and shielding layer includes a top surface facing away from the light pervious member, a bottom surface facing the light pervious member, and a through hole extending from the top surface to the bottom surface. The blocking and shielding layer includes an electromagnetic shielding layer having a first part of the top surface, and a light blocking layer. The light blocking layer includes a first portion having the bottom surface, and a second portion having a second part of the top surface. The light blocking layer extends from the first portion to the second part of the top surface. The electromagnetic shielding layer surrounds the second portion of the light blocking layer. The second portion of the light blocking layer surrounds the through hole Another embodiment provides a lens module. The lens module includes a lens and a light blocking plate with the lens attached thereto. The light blocking plate includes a flat plate-like light pervious member and a blocking and shielding layer. The blocking and shielding layer has a top surface facing away from the light pervious member, a bottom surface facing the light pervious member, and a through hole extending from the top surface to the bottom surface. The through hole is coaxial with the lens. The blocking and shielding layer includes an electromagnetic shielding layer having a first part of the top surface, and a light blocking layer. The light blocking layer includes a first portion having the bottom surface, and a second portion having a second part of the top surface. The light blocking layer extends from the first portion to the second part of the top surface. The electromagnetic shielding layer surrounds the second portion of the light blocking layer. The second portion of the light blocking layer surrounds the through hole.

DETAILED DESCRIPTION

Embodiments will now be described in detail below with reference to the drawings.

Figure 1:
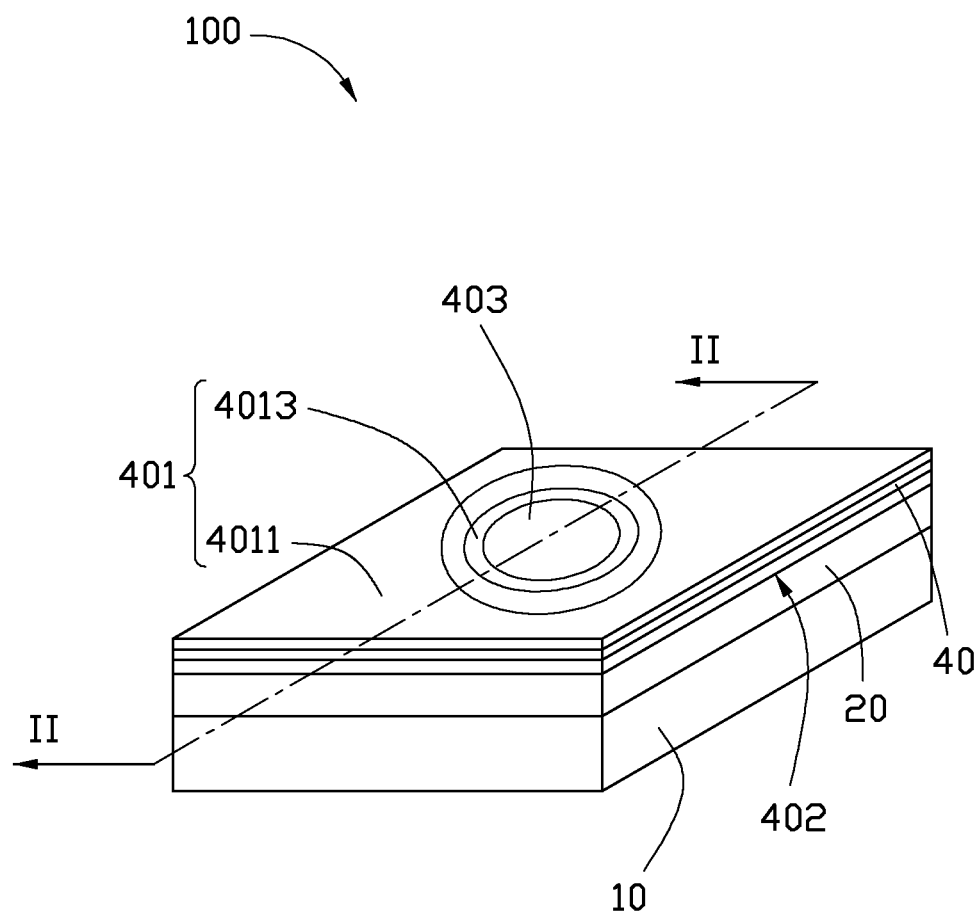
FIG. 1 is a schematic view of a light blocking plate according to a first embodiment.
Figure 2:
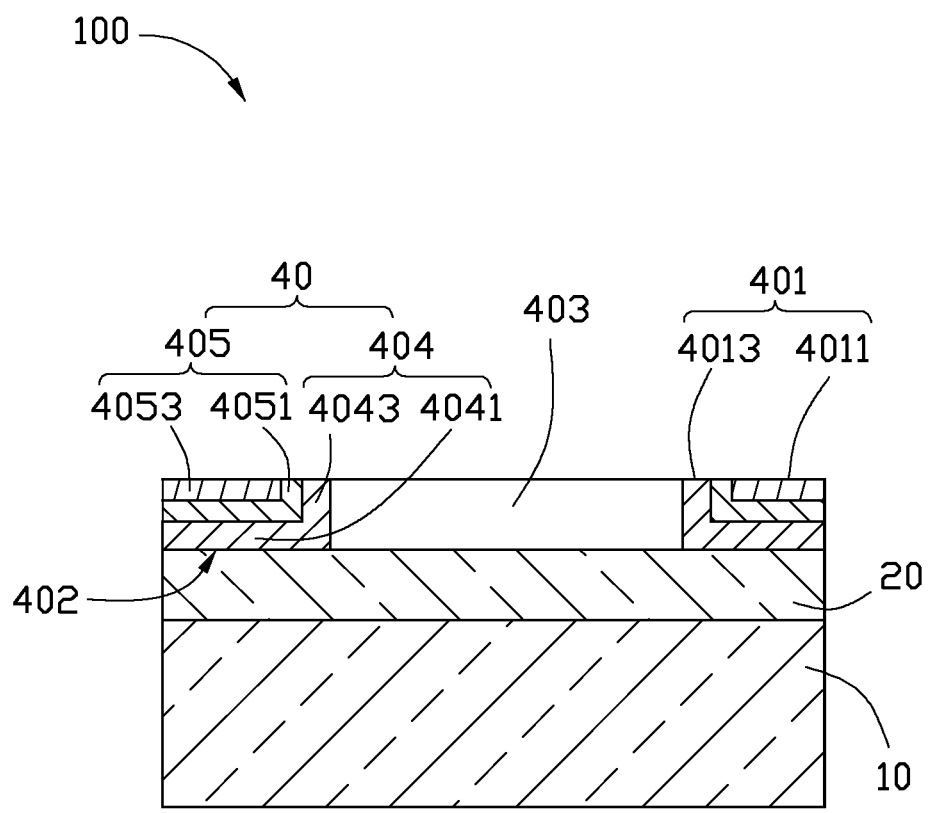
FIG. 2 is a schematic cross-section view of the light blocking plate taken along line II-II of FIG. 1.

Referring to FIGS. 1-2, a light blocking plate 100, in accordance with a first embodiment, is shown. The plate 100 includes a flat plate-like light pervious member 10, an optical filter film 20 formed on the member 10, and a blocking and shielding layer 40 formed on the filter film 20 for blocking light and shielding electromagnetic waves. In other embodiments, the filter film 20 may be omitted.

The member 10 is made of glass for allowing light to pass therethrough. In alternative embodiments, the member 10 may instead be made of plastic.

The filter film 20, in the illustrated embodiment, is an infrared cut-off optical filter film, and is sandwiched between the blocking and shielding layer 40 and the member 10.

The blocking and shielding layer 40 includes a top surface 401 facing away from the member 10, a bottom surface 402 facing the member 10, and a through hole 403 extending from the top surface 401 to the bottom surface 402. The blocking and shielding layer 40 includes a light blocking layer 404, and an electromagnetic shielding layer 405 having a first part 4011 of the top surface 401. The light blocking layer 404 includes a first portion 4041 having the bottom surface 402, and a second portion 4043 having a second part 4013 of the top surface 401, and extending from the first portion 4041 to the second part 4013 of the top surface 401. The electromagnetic shielding layer 405 surrounds the second portion 4043 of the light blocking layer 404, and the second portion 4043 of the light blocking layer 404 surrounds the through hole 403. In the present embodiment, the first portion 4041 is formed on the filter film 20.

The light blocking layer 404 is configured for absorbing stray light, thereby preventing the stray light from reaching the filter film 20. In the present embodiment, the light blocking layer 404 is made of chromium nitride. In alternative embodiments, the light blocking layer 404 may instead be made of chromium, titanium nitride, etc.

The electromagnetic shielding layer 405 is configured for preventing external electromagnetic waves from interfering with the normal operation of an image sensor (not shown) under a lens module (described in the below). The electromagnetic shielding layer 405 is a multi-layered structure, and includes a copper layer 4051 formed on the light blocking layer 404, and a stainless steel layer 4053 formed on the copper layer 4051. The stainless steel layer 4053 is configured for not only shielding external electromagnetic field, but also preventing the copper layer 4051 from being oxidized, thereby improving electromagnetic shielding performance of the electromagnetic shielding layer 405. In alternative embodiment, the electromagnetic shielding layer 405 may instead be a single-layered structure. In other alternative embodiments, the electromagnetic shielding layer 405 may instead be made of any other electromagnetic shielding material, such as ferronickel alloy, electrically conductive plastic, surface conductive material, electrically conductive glass, etc.

A method for making the light blocking plate 100 will be described in detail.

Figure 3:
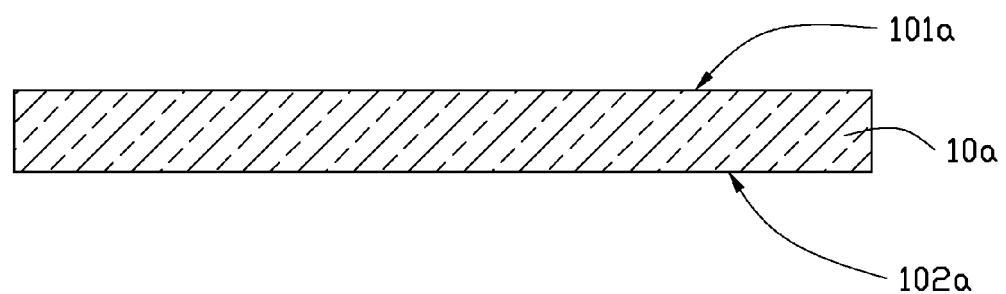
FIGS. 3-10 are cross-sectional views illustrating successive stages in a process for making the light blocking plate of FIG. 1.

Referring to FIG. 3, a flat plate-like light pervious member 10a is provided first. The member 10a, in the illustrated embodiment, is made of glass, and includes a first surface 101a, and a second surface 102a opposite to the first surface 101a.

Figure 4:
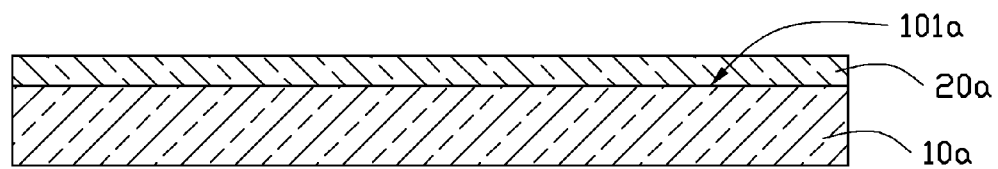

Referring to FIG. 4, an optical filter film 20a is formed on the first surface 101a of the member 10a. In the present embodiment, the filter film 20a is an infrared cut-off filter coating. In alternative embodiments, the filter film 20a may instead be a low pass filter coating, an ultraviolet cut-off filter coating, etc. In further alternative embodiments, the filter film 20a may be formed on the second surface 102a. In other alternative embodiments, the filter film 20a may be omitted.

Figure 5:
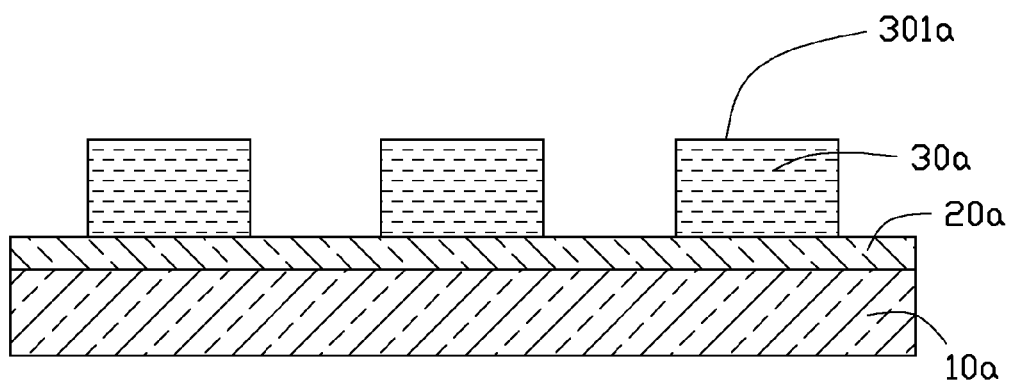

Referring to FIG. 5, a plurality of spaced ceramic power layers 30a are formed on the filter film 20a. Each of ceramic power layers 30a includes an upper surface 301a facing away from the member 10a. In the process of applying the ceramic power layers 30a on the filter film 20a, a plurality of spaced ceramic power bodies (not shown) are formed on the filter film 20a first. Each of the ceramic power body is made of a composition of silicon dioxide, aluminum phosphate, and water. The composition includes silicon dioxide in an amount by weight from 40 percent to 45 percent, aluminum phosphate in an amount by weight from 5 percent to 10 percent, and water in an amount by weight from 45 percent to 50 percent. Then, the member 10a with the ceramic power bodies are disposed under a plurality of lasers (not shown) to cure the respective ceramic power bodies, thereby making the ceramic power bodies into the respective ceramic power layers 30a. The curing temperature is in a range from 400 degrees Celsius to 800 degrees Celsius. In the present embodiment, the ceramic power bodies are formed on the filter film 20a by spin coating, and the curing temperature is 500 degrees Celsius.

Figure 6:
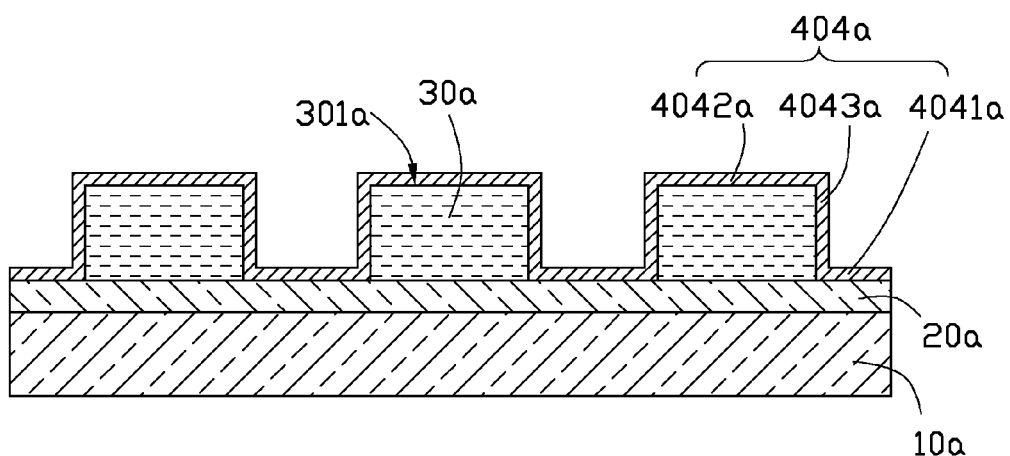

A light blocking layer 404a is formed over the member 10a and side surfaces of the ceramic power layers 30a. In the present embodiment, referring to FIG. 6, the light blocking layer 404a includes a first bottom portion 4041a formed on the member 10a, a plurality of first top portions 4042a formed on the respective upper surfaces 301a of the ceramic power layers 30a, and a plurality of first ring-shaped portions 4043a formed on the respective side surfaces of the ceramic power layers 30a. The ring-shaped portions 4043a connect the first top portions 4042a with the first bottom portion 4041a. The light blocking layer 404a is made of chromium (Cr). The light blocking layer 404a has a uniform thickness, and is formed on the member 10a and the ceramic power layers 30a by a sputtering process. In alternative embodiments, the light blocking layer 404a may instead be made of titanium nitride (TiN). In further alternative embodiments, the light blocking layer 404a may instead be made by an evaporation technique. In still further alternative embodiments, the first top portions 4042a may be omitted.

Figure 7:
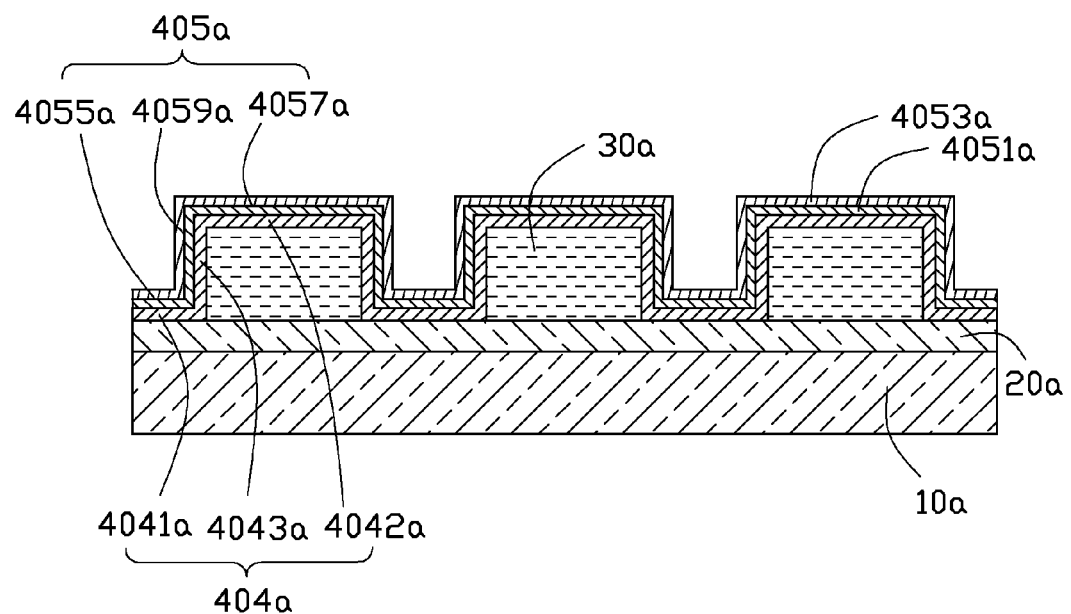

An electromagnetic shielding layer 405a is formed over the light blocking layer 404a. In the present embodiment, referring to FIG. 7, the electromagnetic shielding layer 405a includes a second bottom portion 4055a formed on the first bottom portion 4041a, a plurality of second top portions 4057a formed on the respective first top portions 4042a, and a plurality of second ring-shaped portions 4059a formed on the respective side surfaces of the first ring-shaped portions 4043a. The second ring-shaped portions 4059a connect the second top portions 4057a with the second bottom portion 4055a. The top surfaces of the second bottom portions 4055a, which face away from the member 10a, are lower than or substantially coplanar with the upper surface 301a of the ceramic power layers 30a. In the present embodiment, the electromagnetic shielding layer 405a has a uniform thickness, and is formed by a sputtering process; the top surfaces of the second bottom portions 4055a, which face away from the member 10a, are lower than the upper surface 301a of the ceramic power layers 30a. The electromagnetic shielding layer 405a includes a copper layer 4051a formed over the light blocking layer 404, and a stainless steel layer 4053a formed over the copper layer 4051a. The copper layer 4051a has a uniform thickness, and the stainless steel layer 4053a has a uniform thickness. In other embodiments, the second top portions 4057a may be omitted.

Figure 8:
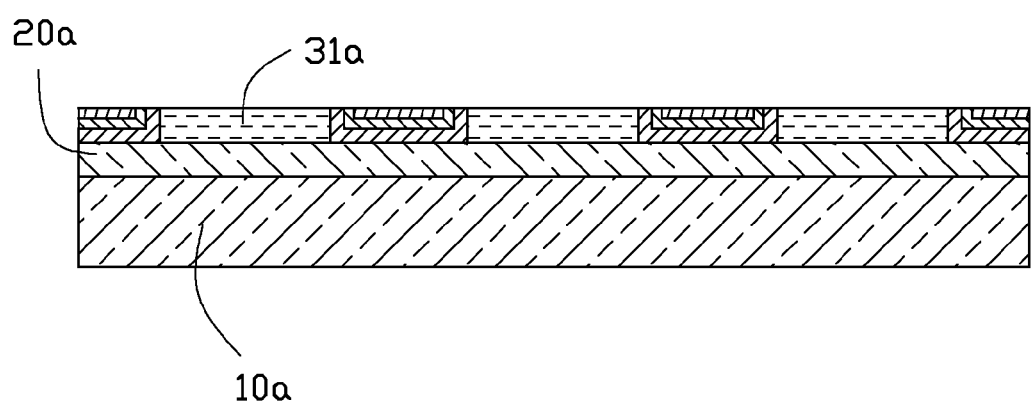

Referring to FIG. 8, a plurality of top portions of the ceramic power layers 30a, which protrudes out of the respective second bottom portions 4055a, is removed from the member 10a by a grinding method, thereby exposing a plurality of respective remaining portions 31a of the ceramic power layers 30a. In other embodiments, if the top surfaces of the second bottom portions 4055a are coplanar with the upper surface 301a of the ceramic power layers 30a, a plurality of top portions, which protrudes out of the respective second bottom portions 4055a, is removed from the member 10a by a grinding method, thereby exposing the ceramic power layers 30a.

Figure 9:
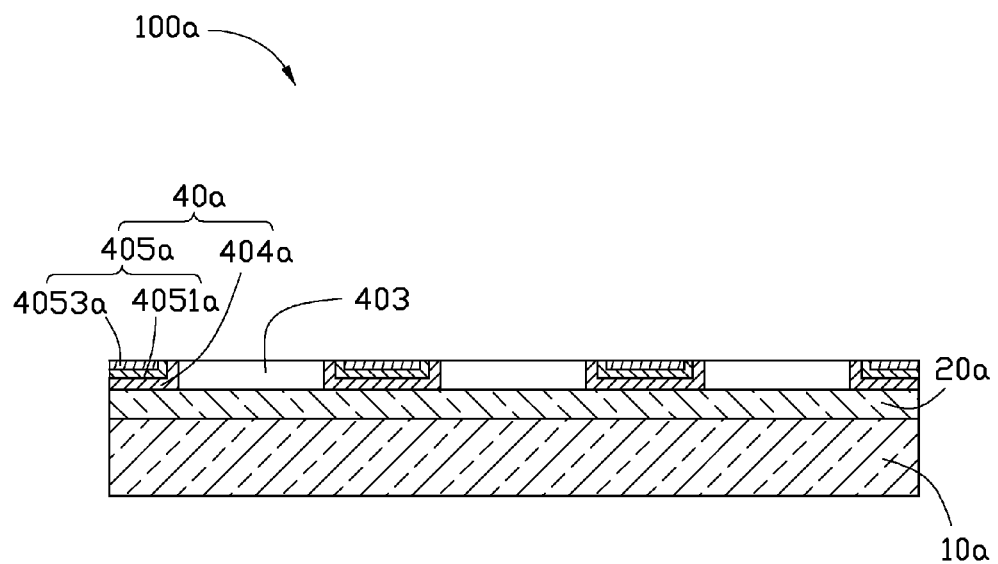

Referring to FIG. 9, the remaining portions 31a of the ceramic power layers 30a are removed from the member 10a, thereby forming a plurality of through holes 403 corresponding to the respective remaining portions 31a. Then, a light blocking plate array 100a is obtained. In the present embodiment, the remaining portions 31a are removed from the member 10a by the grinding method. In alternative embodiments, the remaining portions 31a may be removed from the member 10a by alcohol, or by acetone, or by water. In further alternative embodiments, if the ceramic power layers 30a are exposed, the ceramic power layers 30 may be removed from the flat plate-like light pervious member 10a by alcohol, or by acetone, or by water.

The light blocking plate array 100a is cut into a plurality of light blocking plates 100 (see FIG. 2).

In the method of making the light blocking plate 100, the ceramic power body used as an auxiliary material is cured by laser hardening, and is removed by the grinding method, or by acetone, or by water, or by alcohol. Thus, there is no need to use expensive development processes. Accordingly, the cost of making the light blocking plate 100 can be reduced. In addition, the light blocking plate 100 can not only absorb stray light, but also prevent external electromagnetic waves from interfering with the normal operation of the image sensor. Therefore, the imaging quality of a lens module (not shown) with the light blocking plate 100 is improved.

Figure 10:
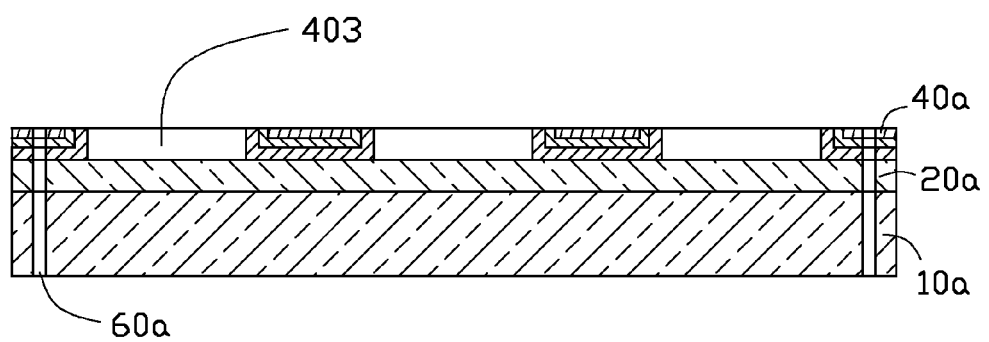

Referring to FIG. 10, in the present embodiment, in order to conveniently align the light blocking plate array 100a with a lens array (described in the below), the light blocking plate array 100a also defines two alignment holes 60a passing through the blocking and shielding 40a, the filter film 20a, and the member 10a. In other embodiments, there may be three, four or more alignment holes 60a.

Figure 11:
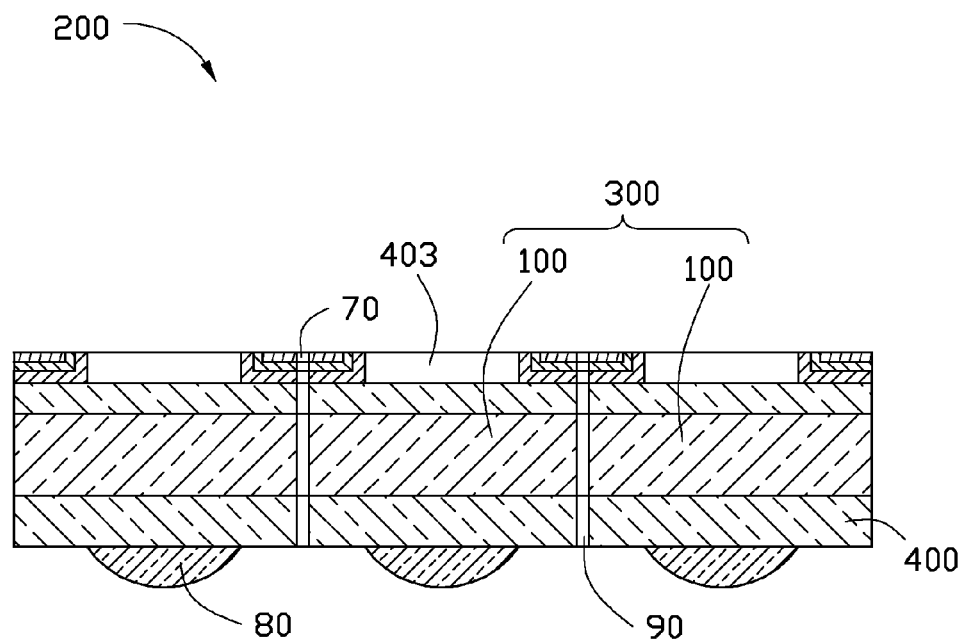
FIG. 11 is a schematic view of a lens module array according to a second embodiment.

Referring to FIG. 11, a lens module array 200, in accordance with a second embodiment, is shown. The lens module array 200 includes a light blocking plate array 300 having a plurality of light blocking plates 100, and a lens array 400 with the light blocking plate array 300 attached thereto.

The method for making the light blocking plate array 300 is similar to the method for making the light blocking plate array 100*a*, except that, there is an alignment hole 70 between any two through holes 403.

The lens array 400 includes a plurality of lenses 80 spatially corresponding to the respective through holes 403, and a plurality of alignment structures 90. In the present embodiment, the alignment structures 90 are holes. In other embodiments, the alignment structures 90 may be protrusions.

Figure 12:
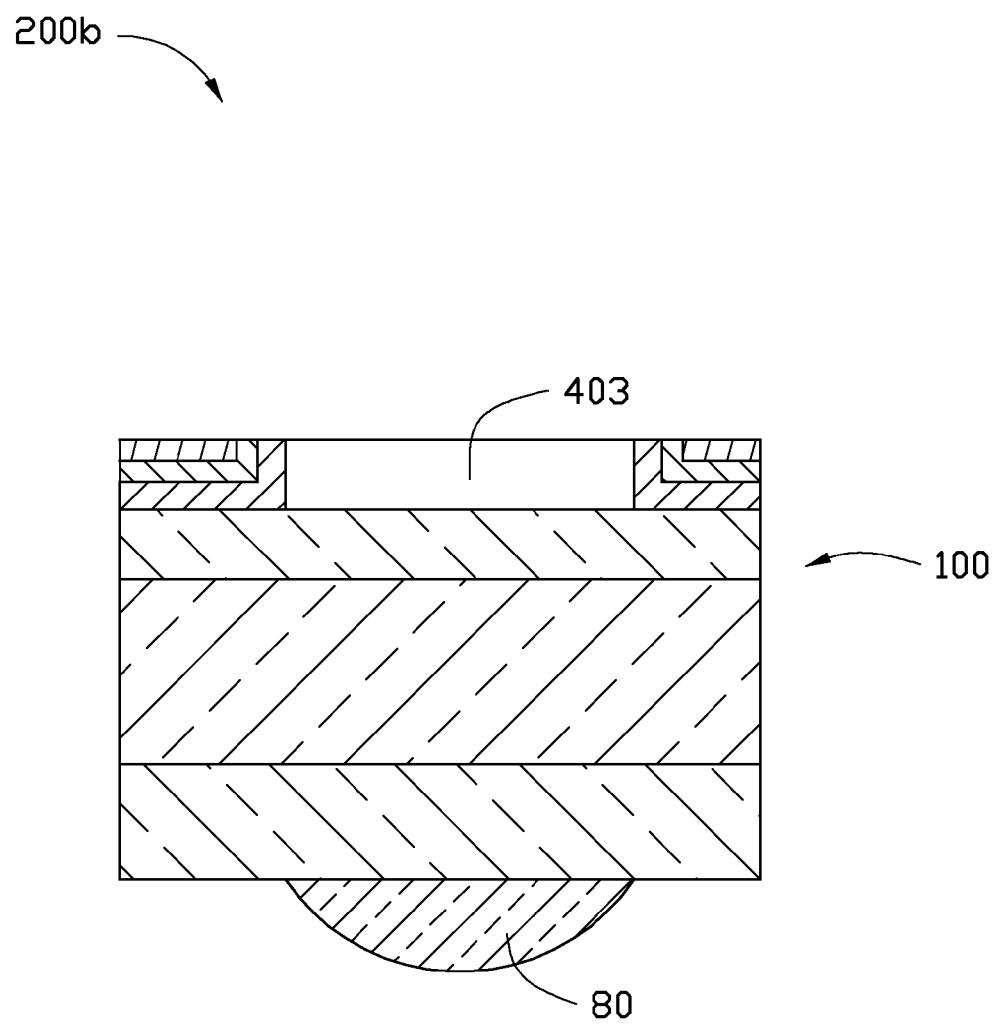
FIG. 12 is a schematic view of a lens module obtained by dicing the lens module array of FIG. 11.

When the light blocking plate array 300 is attached to the lens array 400, the alignments holes 70 align with the respective alignment structures 90, thereby making the through holes 403 coaxial with the respective lenses 80. Finally, a plurality of lens modules 200*b* (see FIG. 12) can be obtained by cutting the light blocking plate array 300 attached to the lens array 400. Each of the lens modules 200*b* includes a lens 80, and a light blocking plate 100 attached to the lens 80.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A light blocking plate comprising:
   a flat plate-like light pervious member; and
   a blocking and shielding layer formed on the light pervious member, the blocking and shielding layer comprising a top surface facing away from the light pervious member, a bottom surface facing the light pervious member, and a through hole extending from the top surface to the bottom surface,
   wherein the blocking and shielding layer comprises an electromagnetic shielding layer having a first part of the top surface, and a light blocking layer, the light blocking layer including a first portion having the bottom surface, and a second portion having a second part of the top surface, and extending from the first portion to the second part of the top surface, the electromagnetic shielding layer surrounding the second portion of the light blocking layer, the second portion of the light blocking layer surrounding the through hole.

2. The light blocking plate of claim 1, wherein the electromagnetic shielding layer comprises a stainless steel layer, and a copper layer disposed between the stainless steel layer and the light blocking layer.

3. The light blocking plate of claim 1, wherein the light blocking layer is comprised of a material selected from the group consisting of chromium and titanium nitride.

4. The light blocking plate of claim 1, further comprising an optical filter film sandwiched the blocking and shielding layer and the light pervious member.

5. The light blocking plate of claim 4, wherein the optical filter film is selected from the group consisting of an infrared cut-off filter coating, a low pass filter coating, and an ultraviolet cut-off filter coating.

6. A lens module comprising:
   a lens; and
   a light blocking plate with the lens attached thereto, the light blocking plate comprising:
      a flat plate-like light pervious member; and
      a blocking and shielding layer, the blocking and shielding layer comprising a top surface facing away from the light pervious member, a bottom surface facing the light pervious member, and a through hole extending from the top surface to the bottom surface, the through hole being coaxial with the lens,
   wherein the blocking and shielding layer comprises an electromagnetic shielding layer having a first part of the top surface, and a light blocking layer, the light blocking layer including a first portion having the bottom surface, and a second portion having a second part of the top surface, and extending from the first portion to the second part of the top surface, the electromagnetic shielding layer surrounding the second portion of the light blocking layer, the second portion of the light blocking layer surrounding the through hole.

7. The lens module of claim 6, wherein the electromagnetic shielding layer comprises a stainless steel layer, and a copper layer disposed between the stainless steel layer and the light blocking layer.

8. The lens module of claim 6, wherein the light blocking layer is comprised of a material selected from the group consisting of chromium and titanium nitride.

9. The lens module of claim 6, further comprising an optical filter film sandwiched the blocking and shielding layer and the light pervious member.

10. The lens module of claim 9, wherein the optical filter film is selected from the group consisting of an infrared cut-off filter coating, a low pass filter coating, and an ultraviolet cut-off filter coating.

* * * * *